United States Patent [19]

Edmisson

[11] Patent Number: 4,645,013
[45] Date of Patent: Feb. 24, 1987

[54] AGRICULTURAL SWEEP

[75] Inventor: Delmar D. Edmisson, Guymon, Okla.

[73] Assignee: Adams Hard-Facing Company, Inc., Guymon, Okla.

[21] Appl. No.: 775,142

[22] Filed: Sep. 12, 1985

[51] Int. Cl.$^4$ .................. A01B 15/04; A01B 39/22
[52] U.S. Cl. .................. 172/730; 172/719; 172/745; 172/747
[58] Field of Search .............. 172/719, 720, 721, 724, 172/725, 726, 730, 731, 732, 733, 745, 770, 772, 777, 747; 111/7, 86; 37/141 T, 142 R

[56] References Cited

U.S. PATENT DOCUMENTS

| | | | |
|---|---|---|---|
| 1,095,404 | 5/1914 | Koepke | 172/719 |
| 1,587,694 | 6/1926 | Brown | 172/733 X |
| 3,005,502 | 10/1961 | Teal | 172/726 |
| 4,132,181 | 1/1979 | Smith et al. | 172/719 X |
| 4,363,364 | 12/1982 | Wetmore | 172/745 X |
| 4,408,667 | 10/1983 | Jarvis | 172/719 X |
| 4,446,801 | 5/1984 | Machnee et al. | 111/86 |
| 4,457,381 | 7/1984 | Wetmore | 172/730 X |
| 4,482,020 | 11/1984 | Jarvis | 172/726 |
| 4,529,042 | 7/1985 | Wetmore | 172/719 |

FOREIGN PATENT DOCUMENTS

| | | | |
|---|---|---|---|
| 299227 | 10/1928 | United Kingdom | 172/719 |
| 510183 | 6/1976 | U.S.S.R. | 172/730 |

Primary Examiner—Richard T. Stouffer
Attorney, Agent, or Firm—William R. Laney

[57] ABSTRACT

An agricultural sweep which includes a pair of divergent wings having sharpened, earth-cutting edges. The wings define an angle of between 60° and 100°, and a hard metal insert is used to provide an overlying cap at the forward end of the two wings where the wings converge and extend toward a leading point. The pointed forward ends of the two wings are cut away, and a point carried by the insert is inserted in the space which remains after the pointed forward ends of the two wings have been removed. The insert tapers to a ridge or crest which lies in a plane which bisects the sweep, so that the wings lie on opposite sides of the bisecting plane.

14 Claims, 8 Drawing Figures

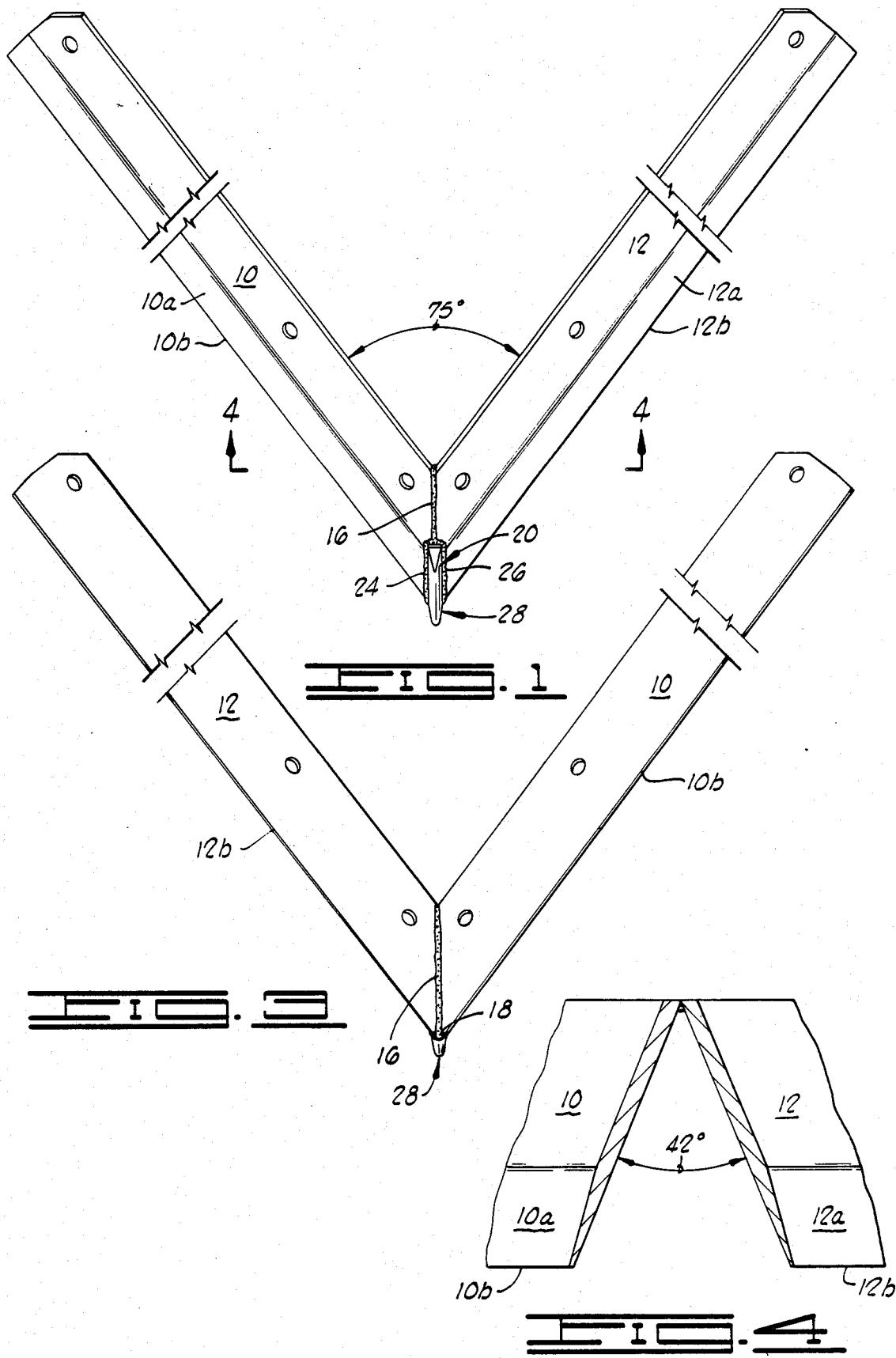

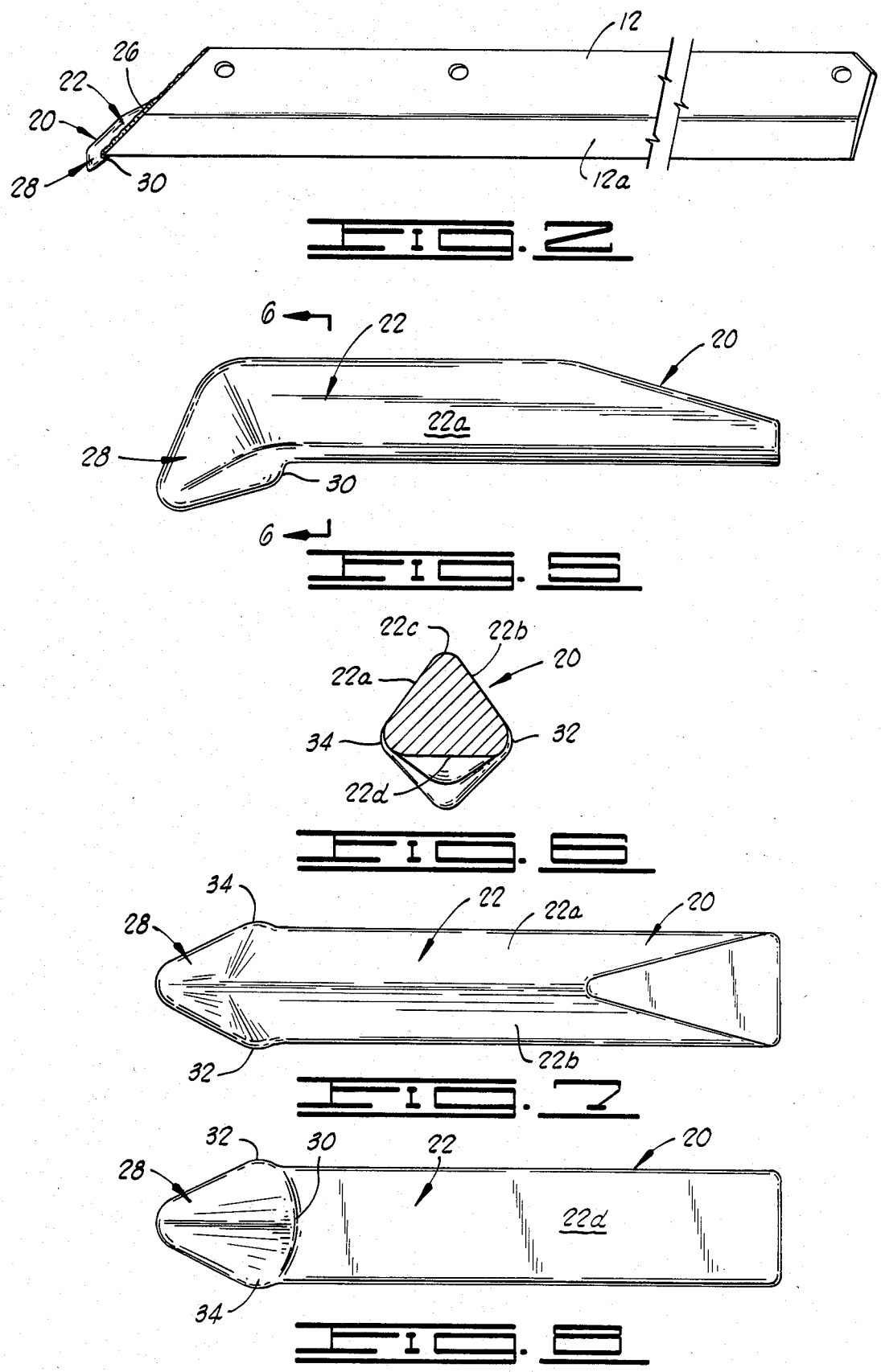

AGRICULTURAL SWEEP

BACKGROUND OF THE INVENTION

1. Field of the Invention

This invention relates to a tillage tool, and particularly to a sweep having a pair of divergent wings which are joined along a central weld line, and further having a hard metal nose insert protectively mounted on the convergent forward ends of the wings.

2. Brief Description of the Prior Art

In the manufacture of agricultural tillage implements and tools, it is desirable to protect cutting edges and penetrating points against excessive soil abrasion by covering these parts of the tool with hard-facing metal, or with an overcap designed to protect such points and cutting edges.

An overcap used to protect tillage tool cutting edges against excessive abrasion is the overcap depicted and described in U.S. Pat. No. 4,529,042 assigned to the assignee of the present invention. A tillage sweep carries the overcap which projects over and shields the leading point of the sweep, as well as the cutting side edges of the sweep which converge at the pointed leading end. The overcap is made of a high hardness metal alloy, such as chromium carbide.

Another patent which shows a capped tillage tool is U.S. Pat. No. 4,363,364. The chisel plow point there disclosed is made of cast chromium carbide which is welded to the point of the plow shank, and is so configured that soil is deflected away from the shank which is thus protected from abrasive wear.

A popular type of sweep in current use is one which has a pair of elongated divergent wings, and is adapted for use on certain types of plows. This sweep, sometimes referred to as a Noble sweep, has been constructed with metal hard-facing provided along the line where the two wings of the sweep join, and at the leading edges and leading point of the sweep.

Other types of protective hard-facing elements are those which are illustrated and described in U.S. Pat. Nos. 2,904,119; 2,598,121; 2,876,853; 1,145,212; 3,188,989; 3,326,152; 2,598,121 and 3,439,636

GENERAL DESCRIPTION OF THE PRESENT INVENTION

The present invention constitutes an agricultural sweep which includes a pair of elongated divergent wings which have outlying, sharpened, earth-cutting edges. These edges converge at the forward end of the sweep and are terminated short of intersection by cutting away the forward end of the two wings along aligned transverse lines of cut to provide a blunt nose. The wings define an angle of divergence which is between about 60° and about 100°. A hard metal insert element, constituting an elongated shank or body portion and a head portion, is used to provide an overlying cap or protective structure at the forward end of the two wings where the wings converge and extend toward a leading point. The blunt edge of the two wings at the leading end thereof where the wings have been cut away lies adjacent a downwardly and forwardly extending head carried at the forward end of the insert element which is mounted on the wings along the line of joinder where the wings are abutted along an edge portion of each. At its upper side, the insert tapers to a ridge or crest which lies in a central plane, which plane bisects the angle defined between the two wings, so that the wings lie on opposite sides of this bisecting plane.

An important object of the present invention is to provide a Noble sweep made up of a pair of centrally joined divergent wings so as to, in effect, form a one-piece blade, which blade is effectively protected by a nose insert, whereby the sweep is characterized in having a relatively long and effective operating life with minimal wear occuring over that life.

A further object of the invention is to provide a nose insert for a divergent wing sweep, with the insert shaped so that a portion of the insert is inset into the blade, and is located below the cutting edge of the blade to thereby cause the blade to more effectively penetrate the soil, and aid the blade in remaining in the ground.

A further object of the invention is to provide a sweep which is shielded by a nose insert which is affixed to the top side of the converged wings making up the sweep blade, and thus protects the mounting shank of the blade.

A further object of the invention is to provide a protective nose insert for securement to the upper side of a joined pair of wings making up a Noble sweep, which insert is configured so that it becomes sharper as the insert wears, and thus insures good penetration of the sweep over its entire service life.

Additional objects and advantages will become apparent as the following detailed description of the invention is read in conjunction with the accompanying drawings which illustrate a preferred embodiment of the invention.

GENERAL DESCRIPTION OF THE DRAWINGS

FIG. 1 is a top plan view of an agricultural sweep constructed in accordance with the present invention.

FIG. 2 is a side elevation view of the sweep depicted in FIG. 1.

FIG. 3 is a bottom plan view of the agricultural sweep shown in FIG. 1.

FIG. 4 is a sectional view taken along line 4—4 on FIG. 1.

FIG. 5 is an enlarged side elevation view of a hard metal insert which is utilized as a part of the sweep of the invention.

FIG. 6 is a sectional view taken along line 6—6 of FIG. 5.

FIG. 7 is a top plan view of the hard metal insert.

FIG. 8 is a bottom plan view of the hard metal insert depicted in FIGS. 5–7.

DETAILED DESCRIPTION OF A PREFERRED EMBODIMENT OF THE INVENTION

The sweep of the invention includes a pair of divergent wings 10 and 12. Each of the wings 10 and 12 includes a beveled edge portion 10a and 12a, respectively, each of which is beveled generally to a cutting edge, 10b and 12b, respectively, as best depicted in FIGS. 1 and 2. The wings 10 and 12 are joined to each other by welding mating, abutting edges on the wings to each other where the mating edges contact each other. In the operating orientation of the sweep, this line of joinder lies in a vertically extending plane which bisects the angle defined between the two convergent wings. At this location, the wings 10 and 12 are preferably joined to each other by a weld line. It will be noted in referring to FIG. 3 that the sharp point or tip at the leading end of each of the wings 10 and 12 has been cut away so that a blunt forward end 18 is formed at the leading terminus of the weld line 16 by a pair of aligned, transverse edges carried at the forward ends of the two wings. The aligned, transverse edges forming the blunt forward end of the sweep are located in a plane extending normal to the described plane which bisects the angle between the wings.

In a preferred embodiment of the invention, the angle at which the wings extend to each other, when viewed in plan, is from about 60° to about 100°, with the most preferred angle being about 75°. In addition to this plan view angle defined between the convergent wings 10 and 12, as shown in FIG. 1, the two wings are also angled with respect to each other in the manner depicted in FIG. 4. The angle defined between the two planes in which the blades generally lie, as represented by the section 4—4 on FIG. 1, and as shown in FIG. 4 of the drawings, is from about 30° to about 60°, with about 42° being preferred.

In order to increase the effective service life of the sweep, and to protect the leading earth penetrating portion of the sweep against abrasion, a hard metal insert 20 is secured to the wings 10 and 12 at the position shown in FIGS. 1-3. The exact configuration of the insert 20 can be best perceived by referring to FIGS. 5-8.

The insert 20 is a unitary casting of a hard metal or alloy, such as chromium carbide. The insert 20 includes an elongated body portion 22 which is of triangular cross-section as shown in FIG. 6. The body portion 22 thus has a pair of convergent side surfaces 22a and 22b which converge at a radiused crest or ridge 22c at the upper side of the insert. The lower or bottom surface 22d lies in a plane, such that, when the insert 20 is placed in position on the upper side of the wings 10 and 12 and centered over the forward end portion of the weld line 16, this bottom surface plane defines with the two wings, opposed, equal angles on opposite sides of the line of joinder of the wings to each other. These spaces or angle, which are from about 60° to about 75° in size, are filled with weld metal to secure the insert 20 to the upper side of the convergent wings in the position illustrated in FIGS. 1, 2 and 3. The weld metal placed in the described spaces is there denominated by reference numerals 24 and 26.

At its forward end, the insert 20 includes a nose or head portion 28. The head portion 28 is angled downwardly relative to the body portion 22 in the manner best illustrated in FIG. 5, and includes an abutment portion or shoulder 30 which bears against the blunt forward end 18 of the wings 10 and 12 where the points thereof have been cut away by a transverse cut. As shown in FIGS. 6, 7 and 8, the head of the insert 20 further includes a pair of outwardly flared ears 32 and 34 which extend laterally outside the longitudinal sides of the body portion 22, and which function, as hereinafter explained, in protecting the point and cutting edges of the sweep when the insert 20 is mounted in its operative position at the forward end of the sweep.

Finally, by reference to FIGS. 5-8, it will be noted that the head 28 of the insert 20 is angled downwardly and tapers to a point by reason of the convergence of the opposite lateral edges or sides of the head, as well as by reason of the convergence of the top and bottom surfaces thereof.

As the configuration of the insert 20, and its particular position at the leading end of the sweep are viewed as these aspects of the invention are shown in the figures of the drawing, it will be noted that the nose of the insert is inset into the blade in a front to rear direction, and bears against the two wings of the blade at the loci 18 where these have been cut away along a transverse line. Because of this arrangement, the insert 20 has a substantial portion of its head 28 which is located below the two cutting edges 10b and 12b of the wings 10 and 12, and this will be apparent by reference to FIG. 2 of the drawings. This characteristic positional relationship between the insert 20 and the wings 10 and 12 causes the sweep to penetrate the soil more effectively, and aids the sweep in sucking into and remaining in the ground.

The insert 20 is positioned over that forward part of the weld line 16 which would otherwise be exposed to the greatest abrasive wear, and which would constitute a critical wear point by reason of its function in joining the wings 10 and 12 to each other. It will be noted, again by reference to FIGS. 1 and 2, that the insert 20 protects the weld line 16 where it extends from the leading end of the two wings 10 and 12 up the beveled portion of each wing to the flat, generally horizontal surface at the trailing side of each wing. This beveled course of the weld line 16 requires protection more than any other part of the weld line, and the insert 20 affords this protection by its critical location thereover. At this elevated location over the two wings, the insert 20 also functions to protect the mounting shank of the sweep. As the sweep is utilized, the nose insert 20 becomes sharper as it wears, and thus insures, with increasing effectiveness, good earth penetration characteristics.

Although a particular preferred embodiment of the invention has been herein described in order that its principles may be understood and followed by those having skill in the technology of fabrication of agricultural implements, it will be understood that some changes and innovations can be effectively made in the illustrated and described sweep without departure from such principles. These types of changes are therefore deemed to be circumscribed by the spirit and scope of the invention, and are intended to be protected by the claims made for this invention, except as the appended claims defining such protection must be necessarily limited in their construction and interpretation.

What is claimed is:

1. An agricultural sweep comprising:
   a pair of elongated wings arranged in a divergent relationship to each other and so as to define an angle of divergence of from about 60° to about 100°, each of said wings having an upper side and a lower side, and having a line of joinder at which the wings are joined to each other, said line of joinder lying in a plane which bisects said angle, and each of said wings further having a beveled cutting edge, said cutting edges converging toward a point of intersection at the leading ends of said wings, but terminating before reaching said point of intersection; and
   a hard metal insert secured to the upper side of said wings over a portion of said line of joinder, said insert including,
     an elongated body portion of triangular cross-sectional configuration; and
     a pointed, downwardly and forwardly directed head portion carried on one end of said body portion and positioned immediately adjacent the termini of said cutting edges at their location of nearest convergence, said head portion extending downwardly below a plane in which both cutting edges of the two wings commonly lie.

2. An agricultural sweep as defined in claim 1 wherein said insert body portion includes:
   a pair of convergent side surfaces which converge at a ridge positioned directly over said line of joinder; and
   a flat bottom surface in contact with each of said wings and welded thereto on each side of said line of joinder.

3. An agricultural sweep as defined in claim 1 wherein said wings define an angle of from about 30° to about 60° with each other as measured in a plane extending normal to said first mentioned plane, and normal to said plane in which said cutting edges commonly lie.

4. An agricultural sweep as defined in claim 3 wherein said insert body portion comprises:
   a pair of convergent side edges which converge at a ridge at the upper side thereof;
   a flat bottom surface extending across a portion of said line of joinder and forming an angle of from about 60° to about 75° with the upper side of each of said wings; and
   weld metal in each of said last mentioned angles and located on opposite sides of said line of joinder and joining said insert to said wings and concurrently protecting said line of joinder from abrasive soil wear.

5. An agricultural sweep as defined in claim 4 wherein said insert is chromium carbide.

6. An agricultural sweep as defined in claim 1 wherein each of said wings has a forward, transverse edge extending thereacross between said cutting edge and said line of joinder, and lying in a plane extending normal to said plane bisecting said angle, said forward, transverse edges being aligned with each other; and
   wherein said insert is further characterized in having a shoulder at the rear side of said head portion bearing against said forward, transverse edges of said wings.

7. An agricultural sweep as defined in claim 6 wherein said insert body portion includes:
   a pair of convergent side surfaces which converge at a ridge positioned directly over said line of joinder; and
   a flat bottom surface in contact with each of said wings and welded thereto on each side of said line of joinder.

8. An agricultural sweep as defined in claim 7 wherein said wings define an angle of from about 30° to about 60° with each other as measured in a plane extending normal to said first mentioned plane, and normal to said plane in which said cutting edges commonly lie.

9. An agricultural sweep as defined in claim 1 wherein said head portion of said insert further comprises a pair of outwardly flared ears which extend laterally therefrom outside longitudinal edges of said body portion.

10. An agricultural sweep as defined in claim 9 wherein said insert body portion includes:
    a pair of convergent side surfaces which converge at a ridge positioned directly over said line of joinder; and
    a flat bottom surface in contact with said wings and welded thereto on each side of said line of joinder.

11. An agricultural sweep as defined in claim 10 wherein said wings define an angle of from about 30° to about 60° with each other as measured in a plane extending normal to said first mentioned plane, and normal to said plane in which said cutting edges commonly lie.

12. An agricultural sweep as defined in claim 1 wherein said head portion of said insert tapers to a point by reason of convergence of opposite lateral edges thereof, as well as by reason of convergence of top and bottom surfaces thereof.

13. An agricultural sweep as defined in claim 12 wherein said insert body portion includes:
    a pair of convergent side surfaces which converge at a ridge positioned directly over said line of joinder; and
    a flat bottom surface in contact with each of said wings and welded thereto on each side of said line of joinder.

14. An agricultural sweep as defined in claim 13 wherein said wings define an angle of from about 30° to about 60° with each other as measured in a plane extending normal to said first mentioned plane, and normal to said plane in which said cutting edges commonly lie.

* * * * *